United States Patent [19]

Dinger et al.

[11] 3,789,291

[45] Jan. 29, 1974

[54] VOLTAGE COMPENSATED PHASE SHIFTING CIRCUIT

[75] Inventors: Edward H. Dinger, Waynesboro, Va.; Richard A. Stasior, Liverpool, N.Y.

[73] Assignee: General Electric Company, Salem, Va.

[22] Filed: Mar. 6, 1973

[21] Appl. No.: 338,617

[52] U.S. Cl. .................. 323/119, 307/4, 307/235 R, 323/34

[51] Int. Cl. .................. G05f 3/02, H03k 5/20

[58] Field of Search... 323/4, 9, 31, 34, 35, 36, 105, 323/38, 119; 307/1, 3, 4, 75, 235 R, 262; 321/40, 47

[56] References Cited

UNITED STATES PATENTS

| | | | |
|---|---|---|---|
| 3,543,049 | 11/1970 | Farnsworth | 307/235 R |
| 3,588,672 | 6/1971 | Wilson | 323/38 X |
| 3,731,181 | 5/1973 | Cecil et al. | 323/4 |

*Primary Examiner*—Gerald Goldberg

*Attorney, Agent, or Firm*—Arnold E. Renner et al.

[57] ABSTRACT

A voltage compensated phase shifting circuit is provided through the employment of a pair of matched transistors having substantially identical electrical characteristics and to the bases of which there is applied a common voltage. The collector to emitter circuits of each of the transistors are supplied, respectively, with currents proportional to the average voltage input and to the instantaneous voltage input. By the proper scaling of the two currents, an output signal representative of a desired phase displacement is obtained which output is substantially independent of instantaneous variations in the input voltage.

10 Claims, 2 Drawing Figures

VOLTAGE COMPENSATED PHASE SHIFTING CIRCUIT

BACKGROUND OF THE INVENTION

In many applications it is desirable to be able to develop a signal which is the function of an accurate number of degrees of phase displacement or shift with respect to an alternating current input signal. For example, in thyristor controlled circuits it is known that the effective output voltage is a function of the point within the alternating current input signal; i.e., the phase, at which time the thyristor is "gated" or caused to conduct. In this type of application there is normally provided some means which provides a thyristor gating signal at a given number of degrees or phase shift after the alternating current input voltage crosses zero. While numerous circuits have been devised for providing this phase shift, the most common is probably a reactance-resistance network which may be either fixed or adjustable. While such networks are adequate for the vast majority of purposes, in certain instances it becomes quite desirable to develop a phase shifted gating signal which is extremely accurate and it is known that the reactance-resistance networks are particularly susceptible to small vaiations in input voltage and frequency such that the error introduced can be substantial.

It is, therefore, an object of the present invention to provide an improved compensated phase shifting network or circuit.

It is a further object to provide a phase shift network which utilizes a matched transistor pair to compare currents proportional to the average and the instantaneous input voltage.

It is a still further object to provide a voltage compensated phase shifting network which is readily adjustable to provide an output signal of desired phase shift or displacement.

SUMMARY OF THE INVENTION

The foregoing and other objects are achieved by the present invention through the provision of a pair of transistors having substantially identical electrical characteristics. Preferably the transistors are made on a single monolithic substrate as by being a part of an integrated circuit. The bases of the two transistors are joined together and have applied thereto a common voltage. To the collector to emitter circuit of a first of the transistors there is provided a current which is proportional to the average half-cycle input voltage while to the collector to emitter circuit of the second transistor there is provided a current which is proportional to the instantaneous value of the input voltage. The collector and base of the first transistor are tied together in a feedback arrangement which will cause a total current to that transistor to divide between the base and collector in accordance with the current gain of the transistor. When the current in the collector to emitter circuit of the second transistor is less than that in the first, the second transistor is in saturation allowing full current to flow in its collector to emitter circuit and there is, essentially, no voltage at the collector with respect to the emitter. When the second transistor collector to emitter current exceeds that of the first transistor, the second transistor is driven out of saturation and a voltage will appear its collector with respect to its emitter. This voltage serves as an indication of the desired phase shift or displacement. Control means may be provided in either or both of the collector to emitter circuits of the two transistors so that the amount of phase displacement indicated by the output signal may be varied.

DESCRIPTION OF THE DRAWINGS

For a better understanding of the present invention, reference is made to the accompanying drawings in which.

DETAILED DESCRIPTION

Figure 1:
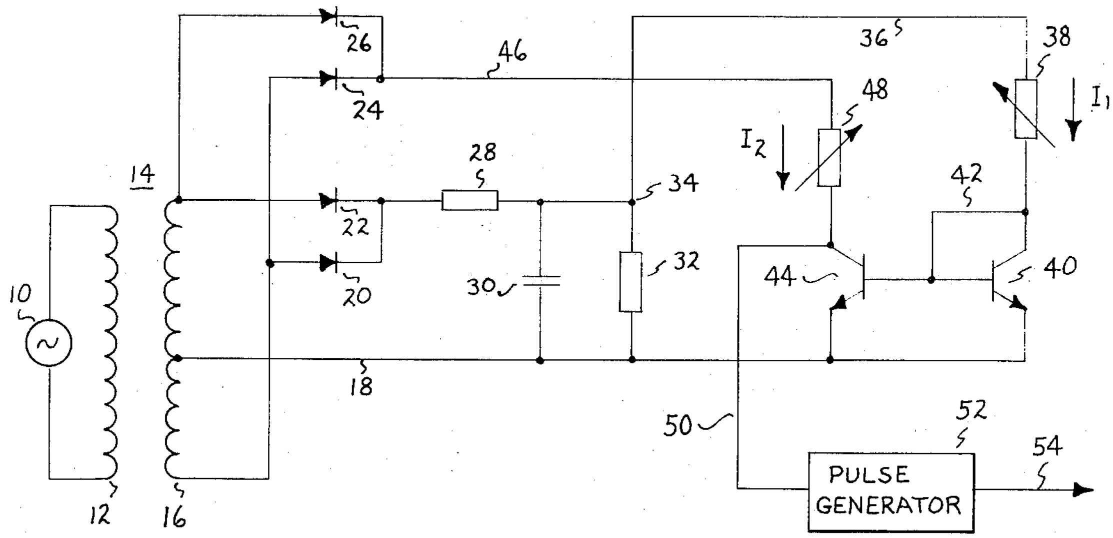
FIG. 1 is a schematic drawing of the preferred embodiment of the phase shifting network in accordance with the present invention; and, FIG. 2 depicts waveshapes helpful in understanding the operation of the present invention.

Referring now to FIG. 1 there is shown an alternating current power source 10 across which is connected a primary 12 of a transformer indicated generally at 14. The transformer 14 is provided with a secondary winding 16 which is center tapped to provide a common lead 18. A first pair of diodes 20 and 22 and a second pair of diodes 24 and 26 are each connected across the center tapped transformer secondary 16 to provide full wave rectification of the alternating current input voltage in a manner well known in the art. The output of the first pair of diodes 20 and 22 is applied as an input to a suitable filtering network illustrated as a resistor 28 in series with the parallel combination of a capacitor 30 and a second resistor 32 such that the output of the filter network, indicated at point 34 in FIG. 1, is a direct current signal which is proportional to the average of the full wave rectified alternating current input. This direct current signal is applied via a conductor 36 to a resistor 38, which in the preferred embodiment is made variable for reasons to be explained hereinafter, such that there flows through the resistor 38 a current designated $I_1$ which is proportional to the average value of the alternating current input voltage. The free end of the resistor 38 is connected to the collector of a first transistor 40 the emitter of which is tied to the common bus 18. The base of the transistor 40 is connected by means of a lead 42 to the collector of that transistor in a feedback arrangement such that the total current will divide between the base and the collector in accordance with the current gain of the transistor. The base of the transistor 40 is also connected to the base of a second transistor 44 such that a common voltage is applied to the two transistor bases.

The output of the second full wave rectifying diodes 24 and 26 provides a signal on a line 46 which is proportional to the instantaneous input voltage. The signal on line 46 is applied to a resistor 48 which may also be adjustable in a manner similar to 38 and for reasons to be subsequently described such that there flows in the resistor 48 a current designated $I_2$ which, so long as transistor 44 remains in saturation, is proportional to the instantaneous value of the signal on line 46. The free end of the resistor 48 is connected to the collector of transistor 44 the emitter of which is also tied to the common bus 18.

The collector of transistor 44 is also connected via a lead 50 to a suitable pulse generator 52 the output of which is indicated at 54. The pulse generator 52 may be of any suitable type which will recognize a change in its input voltage to provide an output pulse. In the preferred embodiment, pulse generator 52 could be a monostable multivibrator, more commonly called a one shot.

As was previously indicated, the two transistors 40 and 44 should exhibit substantially identical electrical characteristics such that their responses to variations in voltage will be substantially identical and such that their variations in response to temperature will also be substantially identical to maintain complete accuracy for which the circuit is designed. Preferably, these transistors are formed on a single monolithic substrate such as being formed on the same integrated circuit chip.

Figure 2:
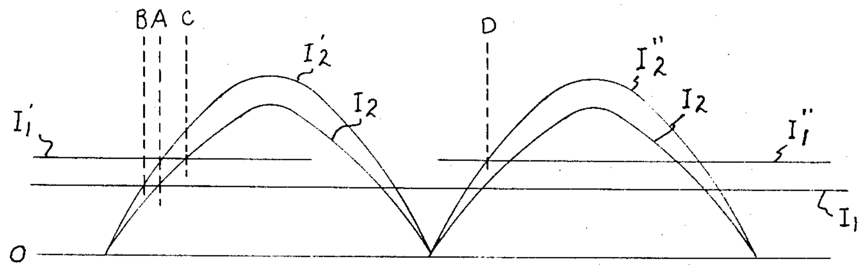

For a better understanding of the invention and its operation, reference is made to FIG. 2 in conjunction with FIG. 1. Referring now to these figures, it is seen that with the application of an alternating current voltage to the transformer 14, the current $I_1$ which is a d.c. current having a magnitude proportional to the average value of the applied voltage begins to flow through resistor 38 and in the collector to emitter circuit of the transistor 40. The current $I_1$ is shown in FIG. 2 of a prescribed value and it is recognized that the value of this current will be a function of the applied voltage and also the value of the resistor 38. With specific reference now to the first half cycle as shown in FIG. 2, upon application of an applied voltage, a current $I_2$ will flow through the resistor 48 and in the collector to emitter circuit of the transistor 44. So long as the value of the current $I_2$ is less than that of $I_1$, transistor 44 remains in saturation allowing a collector to emitter current which is directly proportional to the instantaneous value of the applied voltage and the voltage at the collector of transistor 44, which appears on line 50 to the pulse generator, is substantially zero. When, however, current $I_2$ equals that value of $I_x$ the transistor 44 is pulled out of saturation and its current will remain substantially constant even though the voltage on line 46, with respect to line 18 is increasing. When the current through transistor 44 stops increasing, its collector voltage will incrementally increase by the same amount as the voltage on line 46 increases. This increasing collector voltage will appear on line 50 at the input of the pulse generator 52 and case that generator to generate an output on line 54. The point at which this occurs is illustrated in the first half cycle as shown in FIG. 2 at point A which corresponds to the intersection of the direct current $I_1$ and the lower of the two sine waves designated $I_2$.

The first or left half cycle of FIG. 2 also illustrates the use of the two variable resistors 48 and 38 as shown in FIG. 1. Point A, as shown in FIG. 2, is of a particular phase displacement or shift with respect to the zero crossover of the alternating current input. As illustrated in FIG. 2 this is approximately 30 degrees. If it is desired to change this phase displacement, either or both of the resistors 48 and 38 may be changed. As an illustration it will be assumed that the resistor 48 is adjusted to a smaller value to provide a larger current in the collector to emitter circuit of transistor 44 as illustrated by the curve designated $I_2'$. If then the resistor 38 is left in its initial setting, it is seen that $I_2$ rises at a higher rate such that its intersection with current $I_1$ is at point B. This is at an earlier time than is point A and would be a lesser phase angle displacement. Alternatively, adjustment of resistor 38 to a smaller value would result in a larger current in transistor 40 which is illustrated the curve designated $I_1'$ in the first half cycle of FIG. 2. Utilizing this larger $I_1$ current with the original current as shown on $I_2$ it is seen that the intersection occurs at point C which is a greater phase displacement. Thus, either or both of these resistors may be modified to vary the phase angle shift and to thus vary the time of triggering the pulse generator 52.

In the second half cycle shown in FIG. 2 there is illustrated the voltage compensation feature of the present invention. In that half cycle it is seen that, similarly to that previously described the intersection of the two currents $I_1$ and $I_2$ is at a point designated D corresponding to approximately 30° phase shift. If now the input voltage were to change, for example to increase, both currents which are derived from the same supply voltage would tend to rise to the point as illustrated by the two additional graphs designated $I_2''$ and $I_1''$. Because the same voltage variation affects both currents, the increases will be proportional and it is seen that the intersection of these lines is at the same phase displacement as was originally provided and as is indicated by the point D on the graph.

Thus it is seen there has been shown and described a voltage compensated phase shifting circuit which is extremely accurate and which is self-compensating for variations in input voltage. This circuit is relatively simple and preferably for temperature compensation may have its critical components, namely the two transistors, placed on the same monolithic substrate. While the preferred embodiment has been shown and described, modifications thereto will readily occur to those skilled in the art. For example, the two resistors 48 and 38 have been shown as adjustable resistors. It is readily apparent that the means by which these adjustments could be made are several including manual adjustment and automatic control of the values by some means to which the circuit is associated. Additionally while the invention has been illustrated using NPN transistors it is readily apparent that PNP transistors could be employed with equal facility making the appropriate adjustment for polarity of applied voltages. It is not, therefore, intended that the present invention be limited to that shown and described but that it is intended within the appended claims to cover all such modifications as fall within the true spirit and scope of the invention.

What is claimed is:

1. A circuit for determining a prescribed shift in phase with respect to an alternating current input voltage comprising:

a. a pair of transistors having substantially identical electrical characteristics, each of said transistors having a base, an emitter and a collector;
b. means for providing the same voltage to the bases of each of said transistors;
c. means for providing a first current proportional to average positive half cycle of the input voltage to the collector to emitter circuit of a first of said transistors;
d. means to interconnect the collector and base of the first of said transistors; and,
e. means for providing a second current proportional to the instantaneous value of the input voltage to the collector to emitter circuit of the other of said transistors whereby the values of said first and second currents are compared to provide an output signal from the collector to emitter circuit of said other transistor indicative of said prescribed shift in phase.

2. The invention in accordance with claim 1 further including a pulse generating means responsive to said output signal.

3. The invention in accordance with claim 1 further including means for selectively varying the magnitude of at least one of said first and second currents.

4. The invention in accordance with claim 3 wherein said last recited means includes at least one variable resistor.

5. A circuit for determining a prescribed displacement in phase with respect to an alternating current input voltage source comprising:

a. a transformer having a primary winding in circuit with said voltage source and a center tapped secondary winding;
b. full wave rectification means connected to said center tapped secondary winding to provide a rectified voltage;
c. first and second transistors having substantially identical electrical characteristics, each of said transistors having a base, an emitter and a collector;
d. means interconnecting the bases of said first and second transistors whereby a common voltage may be applied to said bases;
e. means interconnecting the base and the collector of said first transistor;
f. first circuit means interconnecting said full wave rectification means and said first transistor for providing a first current proportional to said average rectified voltage to the collector to emitter circuit of said first transistor; and,
g. second circuit means interconnecting said full wave rectification means with said second transistor for providing a second current proportional to the instantaneous value of said rectified voltage to the collector to emitter circuit of said second transistor whereby said first and second currents are compared to provide an output signal indicative of said prescribed displacement in phase.

6. The invention in accordance with claim 5 further including a pulse generating means responsive to said output signal.

7. The invention in accordance with claim 5 wherein at least one of said first and said second circuit means to vary the magnitude of its respective current.

8. The invention in accordance with claim 5 wherein said first and said second circuit means each includes means to vary the magnitude of its respective current.

9. The invention in accordance with claim 5 wherein said first circuit means includes filtering means.

10. The invention in accordance with claim 7 wherein said means to vary includes a variable resistor.

* * * * *